UNITED STATES PATENT OFFICE.

PAUL C. SMITH, OF TOPEKA, KANSAS.

COMPOSITION OF MATTER FOR PAVING.

SPECIFICATION forming part of Letters Patent No. 339,340, dated April 6, 1886.

Application filed March 7, 1884. Serial No. 123,424. (No specimens.)

*To all whom it may concern:*

Be it known that I, PAUL C. SMITH, a citizen of the United States, residing at the city of Topeka, in the county of Shawnee and State of Kansas, have invented a new and useful Composition of Matter, which I entitle "Smith's Vulcanized Asphalt Block Pavement and Flooring," to be used in laying pavements and floors, of which the following is a specification.

My composition of matter consists of the following ingredients, combined in the proportions stated, to wit: crushed stone or gravel, ten parts; coal-ashes, two parts; plumbago, one part; soapstone, one part; mica, one part; asphalt, three parts; rosin, one part. These ingredients are to be mixed and thoroughly mingled by the following process: The asphalt is to be heated in a kettle by itself, and must be brought to and kept at the boiling-point. The rosin is to be added to the asphalt when it has attained the boiling-point, and must be thoroughly mixed with it by stirring. The crushed stone or gravel and ashes are to be put into a vessel of iron, ordinarily having a capacity of about six barrels, which is located over a steam heating apparatus. When the stone or gravel and ashes are dry and hot, the plumbago, soapstone, and mica are added, when the boiling asphalt and rosin are poured in upon them, and the whole is thoroughly mixed and mingled by stirring. The mixture is then shoveled out into strong iron forms, of any desired figure and size, and is subjected to a pressure of a ton or more to the cubic inch. It is then removed from the forms and placed upon a platform and dried by the sun or by artificial heat. When dried, the blocks are faced on a rubbing-bed, the same as is used in facing marble or slate, after which they may be laid in pavement or floors by any of the known methods of laying tile or brick.

Having given the ingredients of which my composition of matter is composed, and having described the process by which they are commingled and made ready for use,

What I claim, and desire to secure by Letters Patent of the United States, is—

In the preparation of a composition of matter for paving purposes, the combination of crushed stone, coal-ashes, plumbago, soapstone, mica, asphalt, and rosin, substantially in the proportions respectively given.

PAUL C. SMITH.

Witnesses:
S. L. LEAVITT,
WM. H. POOR.